US009132909B1

(12) United States Patent
Khorrami et al.

(10) Patent No.: US 9,132,909 B1
(45) Date of Patent: Sep. 15, 2015

(54) FLAP EDGE NOISE REDUCTION FINS

(71) Applicant: The United States of America as represented by the Administrator of the National Aeronautics and Space Administration, Washington, DC (US)

(72) Inventors: Mehdi R. Khorrami, Norfolk, VA (US); Meelan M. Choudhan, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 103 days.

(21) Appl. No.: 13/838,163

(22) Filed: Mar. 15, 2013

Related U.S. Application Data

(63) Continuation-in-part of application No. 13/417,347, filed on Mar. 12, 2012, now Pat. No. 8,695,915.

(60) Provisional application No. 61/721,058, filed on Nov. 1, 2012, provisional application No. 61/451,727, filed on Mar. 11, 2011, provisional application No. 61/451,730, filed on Mar. 11, 2011, provisional application No. 61/451,735, filed on Mar. 11, 2011, provisional application No. 61/597,282, filed on Feb. 10, 2012.

(51) Int. Cl.
*B64C 21/00* (2006.01)
*B64C 1/40* (2006.01)

(52) U.S. Cl.
CPC .................................... *B64C 1/40* (2013.01)

(58) Field of Classification Search
USPC .................... 244/1 N, 200, 200.1, 199.4, 204
See application file for complete search history.

(56) References Cited

U.S. PATENT DOCUMENTS

| 3,612,446 | A | | 10/1971 | Lebert | |
|---|---|---|---|---|---|
| 3,779,338 | A | * | 12/1973 | Hayden et al. | 181/296 |
| 3,821,999 | A | | 7/1974 | Guess et al. | |
| 3,853,428 | A | * | 12/1974 | Hayden et al. | 416/231 R |
| 4,240,250 | A | | 12/1980 | Harris | |
| 4,671,473 | A | * | 6/1987 | Goodson | 244/199.4 |
| 6,345,790 | B1 | * | 2/2002 | Brix | 244/199.4 |
| 6,454,219 | B1 | | 9/2002 | Moe | |
| 6,467,732 | B2 | * | 10/2002 | Tsukahara et al. | 244/199.4 |

(Continued)

OTHER PUBLICATIONS

Craig L, Streett, Jay H. Casper, David P. Lockard, Mehdi R. Khorrami, Robert W. Stroker, Ronen Elkroy, Wayne F. Wenneman, and James R. Underbrink "Aerodynamic Noise Reduction for High-Lift Devices on a Swept Wing Model," AIAA Paper 2006-2012, Jan. 2006.

(Continued)

*Primary Examiner* — Philip J Bonzell
(74) *Attorney, Agent, or Firm* — Robin W. Edwards

(57) ABSTRACT

A flap of the type that is movably connected to an aircraft wing to provide control of an aircraft in flight includes opposite ends, wherein at least a first opposite end includes a plurality of substantially rigid, laterally extending protrusions that are spaced apart to form a plurality of fluidly interconnected passageways. The passageways have openings adjacent to upper and lower sides of the flap, and the passageways include a plurality of bends such that high pressure fluid flows from a high pressure region to a low pressure region to provide a boundary condition that inhibits noise resulting from airflow around the end of the flap.

20 Claims, 10 Drawing Sheets

(56) References Cited

U.S. PATENT DOCUMENTS

| | | | | |
|---|---|---|---|---|
| 6,471,157 | B1* | 10/2002 | Streett et al. | 244/1 N |
| 6,491,260 | B2* | 12/2002 | Borchers et al. | 244/199.1 |
| 6,948,906 | B2 | 9/2005 | Leishman et al. | |
| 7,100,875 | B2* | 9/2006 | Shmilovich et al. | 244/199.4 |
| 7,264,200 | B2* | 9/2007 | Bussom et al. | 244/17.25 |
| 7,484,930 | B2 | 2/2009 | Hutcheson et al. | |
| 7,597,289 | B2* | 10/2009 | Shmilovich et al. | 244/199.3 |
| 7,637,462 | B2* | 12/2009 | Pal | 244/199.2 |
| 7,661,629 | B2* | 2/2010 | Shmilovich et al. | 244/199.2 |
| 7,757,992 | B2* | 7/2010 | Bussom et al. | 244/17.25 |
| 8,016,244 | B2* | 9/2011 | Shmilovich et al. | 244/199.3 |
| 8,033,510 | B2 | 10/2011 | Shmilovich et al. | |
| 8,056,850 | B2 | 11/2011 | Lin et al. | |
| 8,096,513 | B2* | 1/2012 | Mau et al. | 244/199.2 |
| 8,376,285 | B1* | 2/2013 | Shmilovich et al. | 244/199.3 |
| 2001/0032907 | A1* | 10/2001 | Borchers et al. | 244/123 |
| 2004/0197194 | A1 | 10/2004 | Leishman et al. | |
| 2005/0061921 | A1* | 3/2005 | Egolf | 244/199 |
| 2005/0184196 | A1* | 8/2005 | Shmilovich et al. | 244/199 |
| 2007/0020099 | A1 | 1/2007 | Hutcheson et al. | |
| 2007/0045476 | A1* | 3/2007 | Shmilovich et al. | 244/199.4 |
| 2007/0262205 | A1* | 11/2007 | Grant | 244/199.2 |
| 2008/0042013 | A1* | 2/2008 | Shmilovich et al. | 244/199.4 |
| 2009/0084905 | A1 | 4/2009 | Mau et al. | |
| 2009/0173835 | A1* | 7/2009 | Shmilovich et al. | 244/199.3 |
| 2010/0294883 | A1 | 11/2010 | Trichs et al. | |

OTHER PUBLICATIONS

Bruce Storms, Julie Hayes, Stephen Jaeger, and Paul Soderman, "Aeroacoustic Study of Flap-Tip Noise Reduction Using Continuous Moldline Technology," AIAA Paper 2000-1976, Jun. 2000.

Florence V. Hetcheson, Thomas F. Brooks, and William M. Humphreys, Jr., "Noise Radiation from a Continuous Mold-Line Link Flap Configuration," AIAA Paper 2008-2986, May 2008.

Meelan Choudhari, David Lockard, Michele Macaraeg, Bart Singer, Craig Streett, Guy Neubert, Robert Stoker, James Underbrink, Mert Berkman, Mehdi Khorrami, Shelly Sadowski, "Aeroacoustic Experiments in the Langley Low-Turbulence Pressure Tunnel," NASA TM-2002-211432, Feb. 2002.

J. Hayes, Clifton Horne, Paul Soderman, and P. Bent, "Airframe Noise Characteristics of a 4.7% Scale DC-10 Model," AIAA Paper 1997-1594, May 1997.

Dristine Meadows, Thomas Brooks, William Humphreys, William Hunter, and Carl Gerhold, "Aeroacoustic Measurements of a Wing-Flap Configuration," AIAA Paper 1997-1595, May 1997.

L.C.Chow, K. Mau, and H. Remy, "Landing Gears and High Lift Devices Airframe Noise Research," AIAA Paper 2002-2408, 2002.

D. Angland, et al., "Measurements of Flow around a Flap Side Edge with Porous Edge Treatment," AIAA Journal, Jul. 7, 2009, pp. 1660-1671, vol. 47, No. 7.

Tony L. Parrott, et al., "Parallel-element liner impedances for improved absorption of broadband sound in ducts," Noise Control Engineering Journal, Nov.-Dec. 1995, pp. 183-195, vol. 43(6).

L. S. Wirt, "Analysis, Testing, and Design of Lined Ducts," The Journal of the Acoustical Society of America, May 1972, pp. 1448-1463, vol. 51(5), Part 1.

Tony L. Parrott, et al., "Effect of Resonator Axis Skew on Normal Incidence Impedance," AIAA 2003-3307, 9th AIAA/CEAS Aeroacoustics Conference, May 12-14, 2003, pp. 1-8, Hilton Head, South Carolina.

Brian M. Howerton, et al., "Validation of an Acoustic Impedance Prediction Model for Skewed Resonators," AIAA 2009-3143, May 2009, pp. 1-21.

M. G. Jones, et al., "Assessment of Soft Vane and Metal Foam Engine Noise Reduction Concepts," AIAA 2009-3142, May 2009, pp. 1-20.

Mehdi R. Khorrami et al., "Application of Passive Porous Treatment to Slat Trailing Edge Noise," NASA/TM-2003-212416, May 2003, pp. 1-14.

Mehdi R. Khorrami, et al., "Novel Approach for Reducing Rotor Tip-Clearance-Induced Noise in Turbofan Engines," AIAA Journal, Aug. 2002, pp. 1518-1528, vol. 40, No. 8.

Meelan Choudhari, et al., "Computational Study of Porous Treatment for Altering Flap Side-Edge Flowfield," AIAA 2003-3113, 9th AIAA/CEAS Aeroacoustics Conference, May 12-14, 2003, pp. 1-15, Hilton Head, South Carolina.

W. Clifton Horne, et al., "Measurements of 26%-scale 777 Airframe Noise in the NASA Ames 40-by 80 Foot Wind Tunnel," AIAA 2005-2810, 11th AIAA/CEAS Aeroacoustics Conference (26th AIAA Aeroacoustics Conference), May 23-25, 2005, pp. 1-19, Monterey, California.

D. Angland, et al., "Measurements of Flow around a Flap Side-Edge with Porous Edge Treatment," AIAA 2006-213, 44th AIAA Aerospace Sciences Meeting and Exhibit, Jan. 9-12, 2006, pp. 1-22, Reno, Nevada.

* cited by examiner

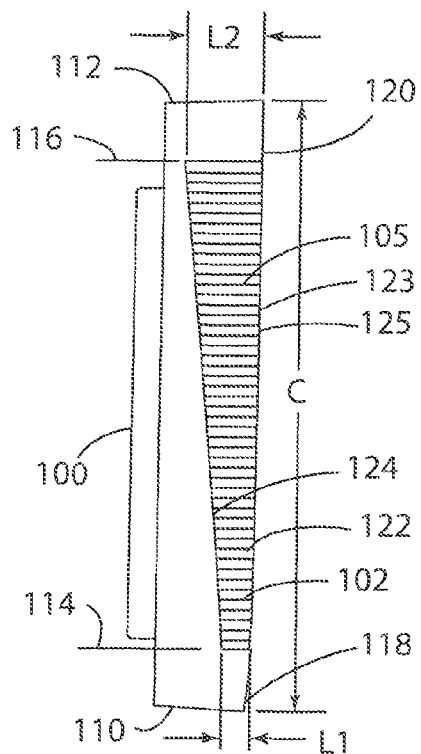
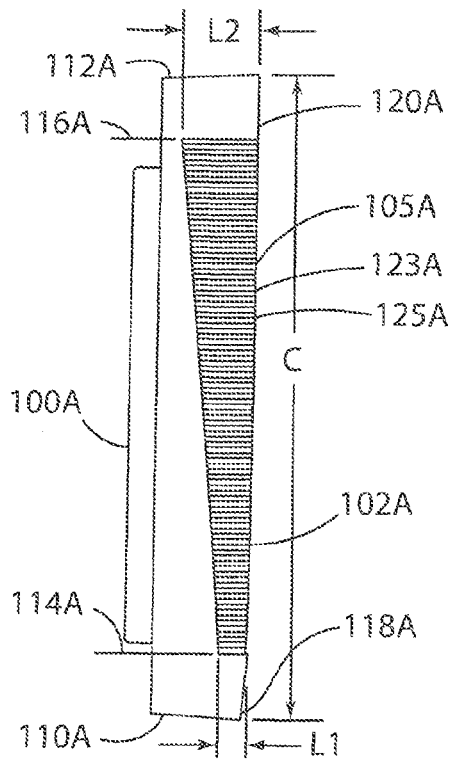
Fig. 9A    Fig. 9B
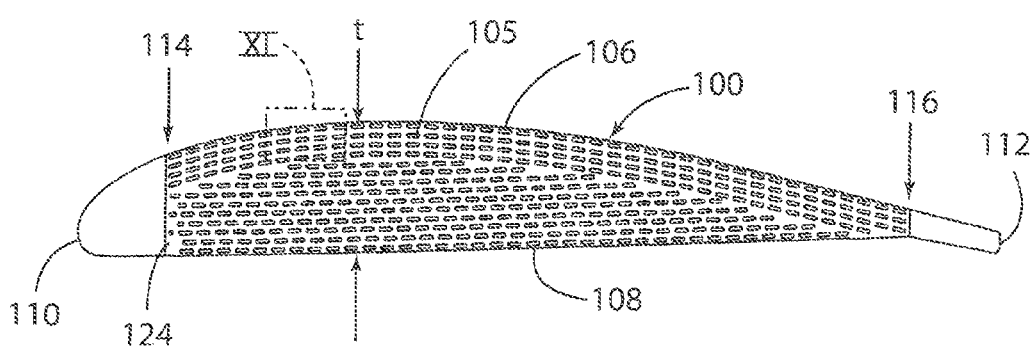
Fig. 10

FLAP EDGE NOISE REDUCTION FINS

CROSS-REFERENCE TO RELATED APPLICATION

This application is a continuation-in-part of U.S. patent application Ser. No. 13/417,347 titled "Flap Side Edge Liners for Airframe Noise Reduction," filed on Mar. 12, 2012, which claims priority to U.S. Provisional Application Nos. 61/451,727, titled "Flap Side Edge Liners for Airframe Noise Reduction," filed on Mar. 11, 2011; 61/451,730, titled "Landing Gear Door Liners for Airframe Noise Reduction," filed on Mar. 11, 2011; 61/451,735, titled "External Acoustic Liners for Multi-Functional Aircraft Noise Reduction," filed on Mar. 11, 2011; and 61/597,282, titled "Reactive Orthotropic Lattice Diffuser (ROLD) for Reducing Aerodynamic Noise from Aircraft Flap Tips," filed on Feb. 10, 2012; the entire contents of all of the foregoing incorporated by reference in this application. This application also claims priority to U.S. Provisional Application No. 61/721,058, titled "Flap Edge Noise Reduction Fins," filed on Nov. 1, 2012, the entire contents of which are incorporated by reference in this application. Further, this application is related to co-pending U.S. patent application Ser. No. 13/417,349, filed on Mar. 12, 2012, titled "Landing Gear Door Liners for Airframe Noise Reduction," U.S. patent application Ser. No. 13/417,351, filed on Mar. 12, 2012, titled "External Acoustic Liners for Multi-Functional Aircraft Noise Reduction," and U.S. patent application Ser. No. 13/764,062, titled "Reactive Orthotropic Lattice Diffuser for Noise Reduction," filed on Feb. 11, 2013; the entire contents of all of the foregoing incorporated by reference in this application.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

FIELD OF THE INVENTION

The present invention relates to reduction in aircraft noise, and in particular to aircraft noise generated by the airframe of the aircraft during operation.

BACKGROUND OF THE INVENTION

One of the more important constraints to the continued growth of air traffic is the related concern regarding aircraft noise. This concern has resulted in increasingly stringent noise restrictions for airports. During aircraft take-off, the dominant aircraft noise source is generally the propulsion noise from the engines of the aircraft. During aircraft approach and landing, airframe noise becomes a prominent component on par with the engine noise. This airframe noise is caused by the interaction of the unsteady and typically turbulent airflow with the aircraft structures. The sound radiated from the side edge of a partial-span flap is one of the major contributors to airframe noise during aircraft approach and landing.

Previous approaches for reducing noise at the flap side edge have included protruding brushes and structural links between flap side edge and the main wing element. Although use of brushes at flap and slat tips has generally been effective for reducing noise produced by these components, the use of brushes has negative side effects. These side effects include degradation in aerodynamic performance of the high-lift wing during landing, and alteration of stall characteristics of the aircraft due to reduction in the maximum lift coefficient.

BRIEF SUMMARY OF THE INVENTION

One aspect of the present invention is a flap of the type that is movably connected to an aircraft to provide control of an aircraft in flight. The flap includes an elongated flap structure defining first and second opposite ends and leading and trailing edges extending lengthwise between the opposite ends. The elongated flap structure defining upper and lower side surfaces extending lengthwise between opposite ends and fore-aft between the leading and trailing edges. In use, airflow adjacent to the opposite ends forms high pressure and low pressure regions along the lower and upper sides, respectively. At least a portion of the first opposite end includes a plurality of substantially rigid laterally extending protrusions that are spaced apart to form a plurality of fluidly interconnected passageways between the protrusions. The passageways have openings adjacent to the upper and lower side of the surfaces of the elongated flap structure. The passageways include a plurality of bends whereby, in use, high pressure and fluid enters the openings adding high pressure region and flows through the passageways to a low pressure region to thereby provide an effective boundary condition that inhibits noise resulting from airflow around the first opposite end of the elongated flap structure. The protrusions may form a plurality of generally horizontal rows, and the protrusions of each row may be horizontally spaced apart to form horizontal gaps. Protrusions of vertically adjacent rows are generally aligned vertically with the horizontal gaps such that the passageways comprise a plurality of vertically juxtaposed S-shaped bends.

Another aspect of the present invention is a flap of the type that is movably connected to an aircraft wing to provide control of the aircraft in flight, wherein the flap includes a flap structure having leading and trailing edges and defining a chord extending between the leading and trailing edges in a fore-aft direction. The structure has upper and lower surfaces extending between the leading and trailing edges. The flap structure further defines first and second opposite ends. At least the first end includes end surfaces forming a plurality of passageways extending vertically between the upper and lower surfaces, and a plurality of passageways extending fore-aft. The vertically extending passageways and the fore-aft passageways intersect and fluidly interconnect with each other at a plurality of horizontally and vertically spaced apart locations such that, in use, air flows from the vertically extending passageways into the fore-aft passageways. At least some of the vertical passageways and the fore-aft passageways are generally U-shaped in cross-section and open outwardly away from the first end of the flap structure such that air can't flow transversely out of the passageways. The end surfaces may comprise a plurality of spaced apart rigid protrusions defining the passageways.

Yet another aspect of the present invention is a method of reducing noise radiated from a side edge of a partial-span wing flap during aircraft approaching and landing. The method includes providing a plurality of rigid protrusions on the side edge of the wing flap, and utilizing the protrusions to reduce a steady pressure differential experienced by the side edge in use. The method further includes utilizing the protrusions to reduce the strength of local hydrodynamic fluctuations associated with scrubbing of unsteady flow over the side edge.

These and other features, advantages, and objects of the present invention will be further understood and appreciated by those skilled in the art by reference to the following specification, claims, and appended drawings.

BRIEF DESCRIPTION OF THE DRAWINGS

FIG. 1, showing one possible configuration of acoustic chambers for noise reduction;

FIG. 9A is a plan view of an end of portion of the flap of FIG. 6;

FIG. 9B is a plan view of an end portion of a flap according to another aspect of the present invention;

FIG. 10 is an end view of the flap of FIG. 9A;

DETAILED DESCRIPTION OF EMBODIMENTS

Figure 1:
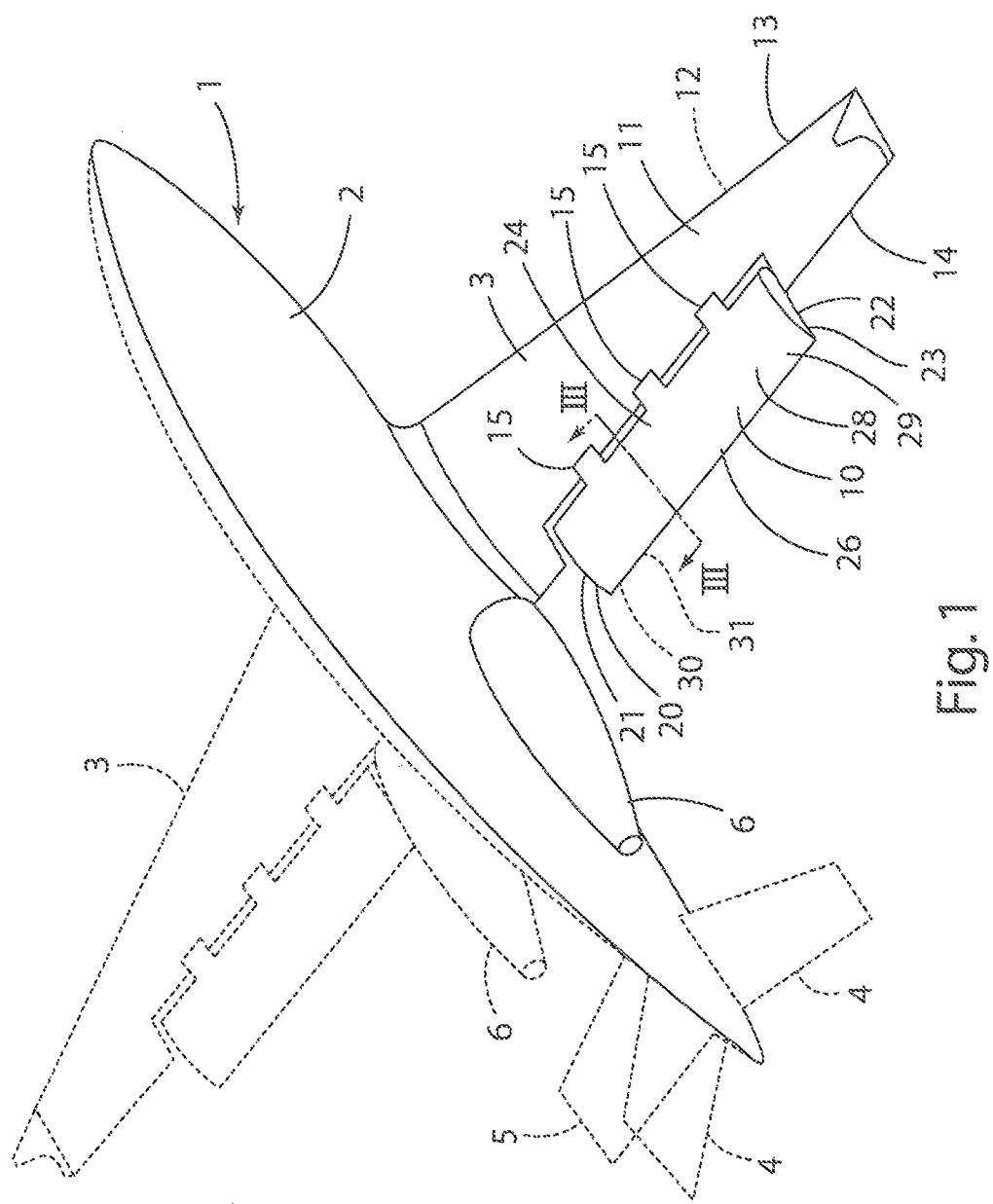
FIG. 1 is a partially fragmentary isometric view of an aircraft having wings and wing flaps.

For purposes of description herein, the terms "upper," "lower," "right," "left," "rear," "front," "vertical," "horizontal," and derivatives thereof shall be related to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Furthermore, references to specific items or features (e.g. a wing structure, leading edge slat, and slat cove filler) shall not be construed as limiting the item or feature to one-piece or multi-piece items or features. Hence, specific dimensions and other physical characteristics relating to the embodiments disclosed herein are not to be considered as limiting, unless the claims expressly state otherwise.

An aircraft 1 (FIG. 1) includes a fuselage 2, wings 3, and horizontal and vertical rear stabilizers 4 and 5, respectively. The aircraft 1 also includes turbofan engines 6 or other propulsion system such as open rotor engines. The fuselage 2, wings 3, stabilizers 4 and 5, and engines 6 may be of a known type, and these components of aircraft 1 will therefore not be described in more detail herein. The left half of aircraft 1 is shown in dashed lines in FIG. 1, but it will be understood that the left and right halves of aircraft 1 are mirror images of one another such that only the right half is described in detail herein.

Wing 3 may include upper and lower surfaces 11 and 12 extending between a leading edge 13 and a trailing edge 14. The aircraft may include an elongated flap structure 10 that is movably connected to the wing 3 adjacent to rear edge 14. The flap 10 is movably interconnected with the wing 3 by connectors 15 to provide control of aircraft 1. In general, powered actuators (not shown) or the like may be utilized to provide movement of flap structure 10 relative to the wing 3. The connecting structures 15 and powered actuators may also be of a conventional type, and are not therefore described in detail herein.

The flap structure 10 includes inboard and outboard ends 20 and 22, respectively, and forward and rearward portions 24 and 26, respectively. The flap structure 10 further includes an upper side 28 having an upper surface 29 and a lower side 30 having a lower surface 31 (see also FIG. 3).

Wing design for conventional transport aircraft is driven largely by cruise efficiency, i.e., the need to generate adequate lift with minimal drag for level flight at high speeds. Conventional high-lift systems (leading-edge slats and trailing-edge flaps) are designed to augment lift and improve stall characteristics at the low landing speeds required under many circumstances. These multi-element airfoil systems increase the effective chord (streamwise dimension) of the wing and thus its effective area. The major effect of the multi-element airfoil arrangement is to generate a much larger pressure difference (lift) between the upper (suction) and lower (pressure) surfaces than would be possible utilizing a single airfoil element. However, the multi-element implementation of the high-lift system presents many discontinuities and other unfavorable geometric characteristics to the flow. These geometric features cause considerable unsteadiness in the flow, which is the primary source of aeroacoustic noise.

The principal geometric features responsible for producing flow unsteadiness around flap 10, and thus noise, are the inboard and outboard edges 21 and 23, respectively, at the inboard and outboard ends 20 and 22, respectively. Computational results display strong suction peaks at the inboard and outboard edges 21 and 23, respectively of flap 10. The suction peaks are attributed to the presence of strong stream-wide vortices. Existence of a strong pressure differential between the bottom and top surfaces of the flap results in the formation of a complex dual-vortex system. Specifically, near the flap leading edge, the boundary layer on the bottom surface separates at the sharp corner and rolls up to form a stronger of the two vortices. Similarly, the thin boundary layer on the side edge separates at the sharp top corner and forms what is initially the weaker of the two vortices. Both vortices gain strength and size along the flap chord because of the sustained generation of vorticity. Downstream of the flap mid-chord, the side vortex begins to interact and merge with the vortex on the top surface. Eventually, a single dominant stream-wise vortex is formed.

Considerable flow unsteadiness (noise sources) is produced during the shear layer roll up, vortex formation and vortex merging process as well as by the interaction of the vortices with the sharp corners at the flap edge. The multi-element airfoil reverts to a smooth single-element profile during the cruise phase of flight to reduce wing drag. In current practice, the multiple airfoil elements are nested together in a retracted position.

The present invention includes a method and structure that reduces this source of airframe noise without compromising cruise efficiency, lift, and stall characteristics at landing. As discussed in more detail below, one aspect of the present invention is the use of acoustic liners that are imbedded within the flap structure 10 to target the propagation phase of acoustic disturbances generated elsewhere. It also targets the very process of noise generation via interaction of the unsteady flow with the flap side edges 21 and 23. By limiting the control action to fluctuations within the flow, the gross aerodynamic characteristics are left unaltered and, hence, the expected aerodynamic penalty is small or none at all. However, the limited volume within the flap edge creates a significant packaging challenge. In addition, the broad frequency range (potentially greater than 3.5 octaves) to be attenuated creates additional challenges.

Known technology used in current commercial aircraft to reduce noise generated at the flap side edges involves implementation of "clean" configurations. Prior concepts include the application of fences, continuous moldline link, porous treatment, and brushes at the flap side edges. Given the critical functionality of aircraft flaps in the control of the aircraft, reconfiguration of this system may be problematic. The known concepts offer a range of noise reduction potentials, but they also have disadvantages ranging from weight penalties, parasitic drag penalties during cruise, and/or a loss of aerodynamic efficiency.

Figure 2:
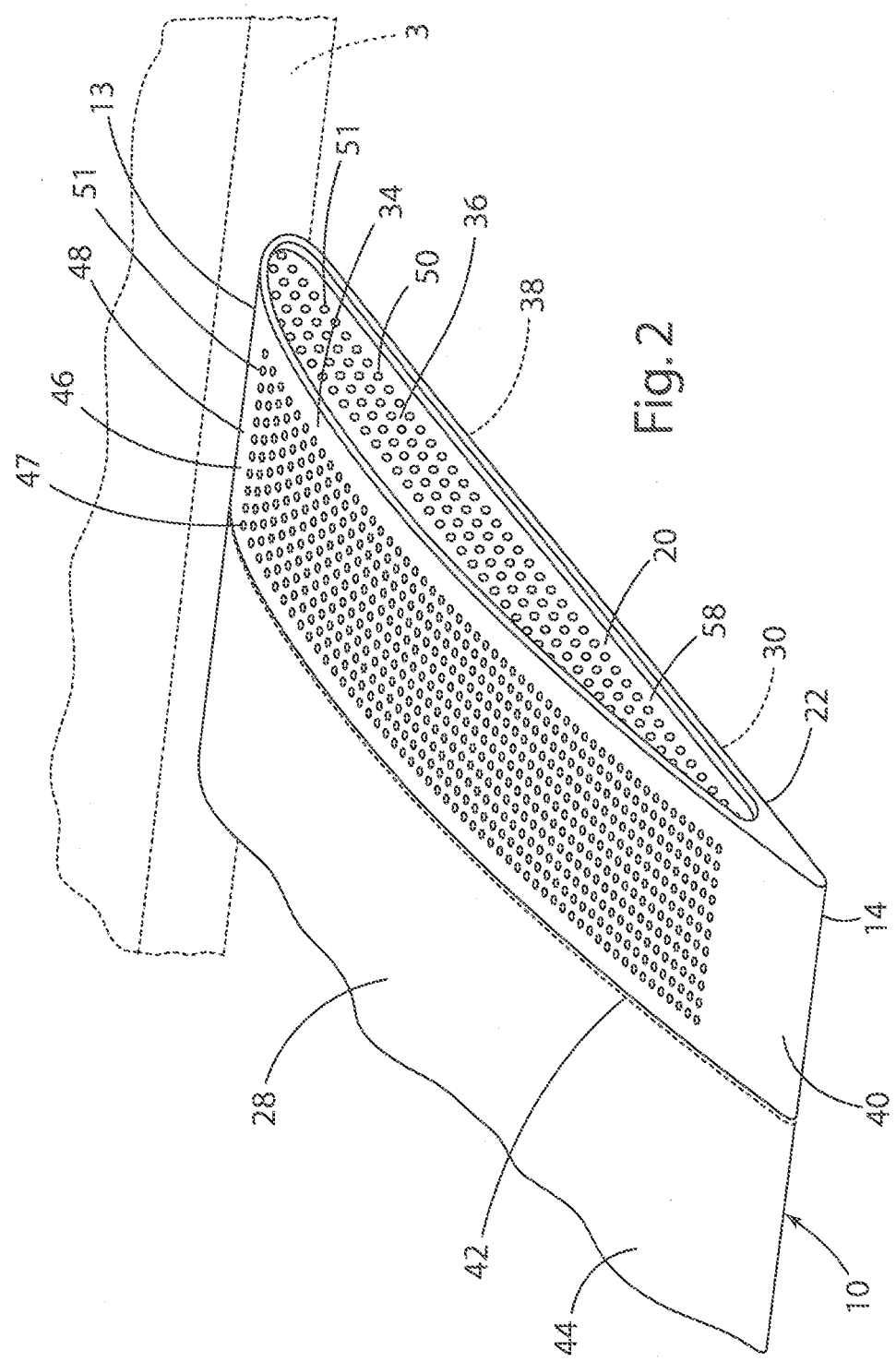
FIG. 2 is a partially fragmentary enlarged isometric view of a portion of the wing flap of the aircraft of FIG. 1.
Figure 4:
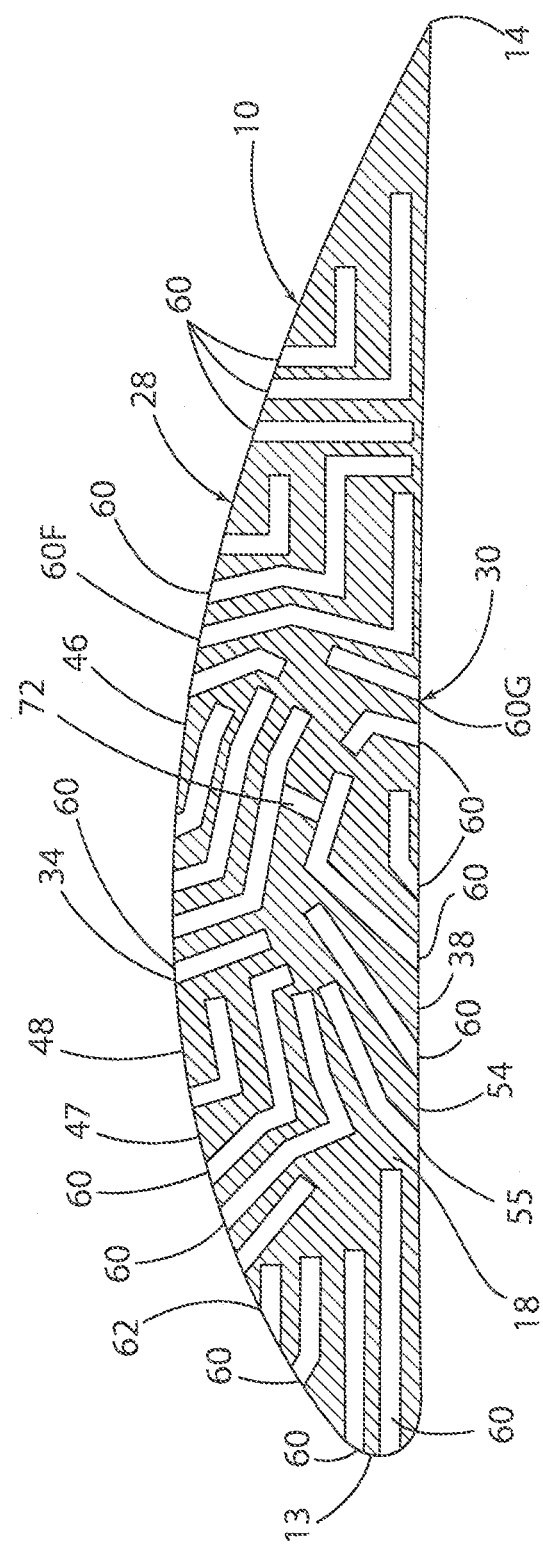
FIG. 4 is a cross-sectional view of a flap showing another possible configuration of the internal acoustic chambers.

With further reference to FIG. 2, a flap structure according to one aspect of the present invention includes an acoustic liner 34 on upper side 28 of flap 10 and/or an acoustic liner 36 on end 20 (or 22), and/or an acoustic liner 38 on a lower side 30 of flap 10 (see also FIG. 4). The end portion 40 of the flap 10 comprises the region of the flap at which unsteady flow generates noise. In FIG. 2, the end portion 40 is separated from a central portion 44 of flap 10 by a line designated 42. It will be understood, however, that the end portion 40 forming a source of noise does not necessarily have a clear boundary line 42, and the end portion 40 may have different sizes and shapes, with no distinct boundary relative to central portion 44 of flap structure 10. Also, the end portion 40 at which unsteady flow occurs, may also change in width from the leading edge 13 to the trailing edge 14. Still further, the areas at the ends of flap 10 that experience unsteady flow may change as aircraft velocity, altitude, and other such operating parameters vary. In a typical commercial aircraft, the end portion 40 is approximately two to ten inches wide (measured from the end of flap 10).

The acoustic liner 34 comprises a thin sheet of material 46 having a plurality of perforations 47 arranged in a substantially uniform repeating pattern to thereby define a porous upper surface portion 48. The perforations 47 may also be arranged in a non-uniform pattern that may or may not be repeating. Porous upper surface 48 may be formed by a thin sheet of material having a plurality of perforations 51, or it may comprise a mesh, or it may be defined by the upper most surfaces of wing 3 adjacent to the openings of the internal chambers (or passageways) 60 (FIGS. 3 and 4) described in more detail below.

Similarly, acoustic liner 36 at end 22 (or end 20) may comprise a sheet of material 50 having a plurality of perforations 51 defining a porous outer surface 58. Surface 58 may be substantially planar, or it may be curved. In general, surface 58 may have a shape/contour that is substantially identical to the shape/contour of the original end surface of flap 10 for a particular aircraft as originally designed by an aircraft manufacturer. Alternately, surface 58 may be specifically contoured to optimize aerodynamics and/or noise reduction taking into account changes to airflow resulting from the presence of one or more acoustic liners according to the present invention. Similarly, acoustic liner 38 on the bottom 30 of flap 10 may comprise a thin sheet of material 54 having a plurality of perforations 55 that permit sound to enter acoustic internal chambers 60 formed in body 18 of flap structure 10. The flap 10 may include only a top acoustic liner 34, or it may include only an end acoustic liner 36, or only a bottom acoustic liner 38, or it may include any combination of the liners 34, 36, and 38, depending upon the requirements of a particular application. Also, the acoustic liners 34, 36, and 38 may cover substantially all of the upper and lower surfaces at end portion 40, or they may extend over only a segment of end portion 40 of flap structure 10. Similarly, the end acoustic liner 36 may cover substantially all of the end 20 (or 21), or it may cover only a portion thereof. The acoustic liners 34 and/or 36 and/or 38 are designed to absorb sound having a specific acoustic frequency profile, and to provide optimum aerodynamic characteristics.

Figure 3:
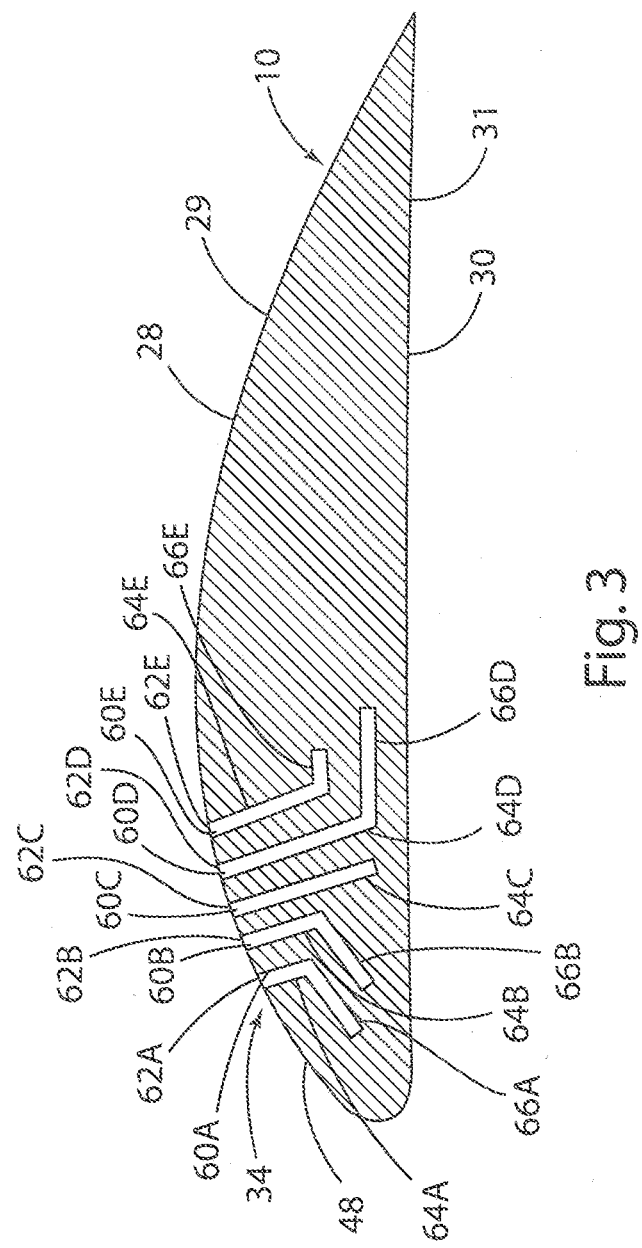
FIG. 3 is a cross-sectional view taken along the line III-III.

With further reference to FIG. 3, acoustic liner 34 on upper side 28 of flap 10 may comprise a plurality of internal acoustic chambers 60A-60E having openings 62A-62E at a porous upper surface 48 that form outer ends of chambers 60A-60E. In the liner 34 shown in FIG. 3, the acoustic chambers 60A-60E each include an outer portion 64A-64E, respectively, that extends inwardly in a direction that is generally transverse or perpendicular to porous upper surface 48. Also, chambers 60A and 60B have inner end portions 66A and 66B, respectively, that extend transverse relative to the outer portions 64A and 64B. A center chamber 60C, however, only includes a straight portion 64C. Acoustic chambers 60D and 60E also include inner, transversely-extending inner end portions 66D and 66E. The inner end portions generally extend at an angle in the range of about 30°-90° relative to outer portion 64A-64E. In general, the key constraint for the orientation of the internal chambers is the requirement that all of the chambers must fit within the volume 10 of the flap. The required chamber length can be realized utilizing straight, bent, L-shaped, or U-shaped configurations. The shape or combination of shapes chosen is dependent upon the lengths required to achieve optimal sound absorption (or pressure release) as well as the amount of volume available for the internal chambers. The acoustic chambers or passageways may have a uniform circular cross-sectional shape, or the cross-sectional shape may be quadrilateral of other geometry. For example, the cross-sectional shapes may be square, octagonal, hexagonal, diamond shaped, or irregularly shapes. The cross-sectional shape may be chosen to provide optimal use of the available internal space for a particular application. The cross-sectional area of the chambers/passageways may be substantially uniform along the length of the passageway, or it may increase or decrease. The specific orientations of the chambers 60 is typically not at all critical with respect to acoustic effects, and the orientation of the internal chambers 60 is largely driven by the need to fit the desired chamber lengths within the limited volume. The fact that most of the chambers 60 of FIG. 3 are nearly perpendicular to the surface at the surface was chosen to simplify the packaging requirement.

With further reference to FIG. 4, flap structure 10 may include a plurality of acoustic chambers 60, each having an opening 62. The acoustic chambers 60 may form an upper acoustic liner 34, a lower acoustic liner 38, and/or an end acoustic liner 36 (not shown in FIG. 4). Each of the acoustic chambers 60 may have a different length and/or shape to thereby absorb sound at different frequencies. Each chamber 60 may be configured to behave as a quarter-wavelength resonator (sometimes called an organ-pipe resonator). Thus, the different lengths of the chambers 60 are selected for optimal absorption of different frequencies. By proper selection of the combination of lengths (in a general sense, length is measured along the centerline of the chamber, whether that is a straight path or it includes one or more bends), a broadband sound absorber can be achieved. Also, the chambers 60 within flap 10 (FIG. 4) may be connected by optional internal passageways 72, such that sound enters through the porous surfaces and travel in multiple directions within the flap 10. Chambers or passageways 60 may have opposite ends that are both open on either the upper surface or the lower surface of flap 10, or they may have one end that is open on the top side of flap 10, and an opposite end that is open on the bottom of flap 10. For example, the chambers 60F and 60G (FIG. 4) could comprise a single chamber extending all the way through flap 10 whereby noise is transmitted internally from the lower surface 12 of flap 10 to the upper surface 11 of flap 10, and/or visa-versa. Designing chambers or passageways 60 such that sound travels in multiple directions within the flap 10 via interconnecting passageways, and exits the flap 10 at a different portion of the porous surface represents one way to provide broadband sound absorption and/or dampening of hydrodynamic fluctuations (i.e. to reduce efficiency of their conversion to propagating sound).

The internal chambers 60 (or the entire flap interior) can also be filled with foam or other acoustic filler material, which changes the manner in which sound is absorbed as it travels through the flap 10.

The flap 10 may include a single internal chamber 60, a plurality of substantially identical internal chambers 60, or a plurality of internal chambers 60 having different lengths and/or shapes. If a number of variable-depth chambers, separated by impervious partitions and terminated within the body of the flap, are imbedded within the flap side edge 21 (or 23), a local-reacting liner results. In the configuration shown in FIG. 4, the internal chambers 60 (or channels) have a circular cross-sectional shape with relatively small diameters, such that a large number of the internal chambers 60 can fit within the relatively small volume of flap 10. According to other aspects of the present invention, the diameter of the interior chambers can be increased, with a porous face sheet covering the resultant openings at the porous surface to provide the desired acoustic resistance. A large number of configurations may be utilized to achieve similar surface acoustic impedance boundary conditions by varying the geometry of the internal chambers and the surface face sheet.

Figure 5:
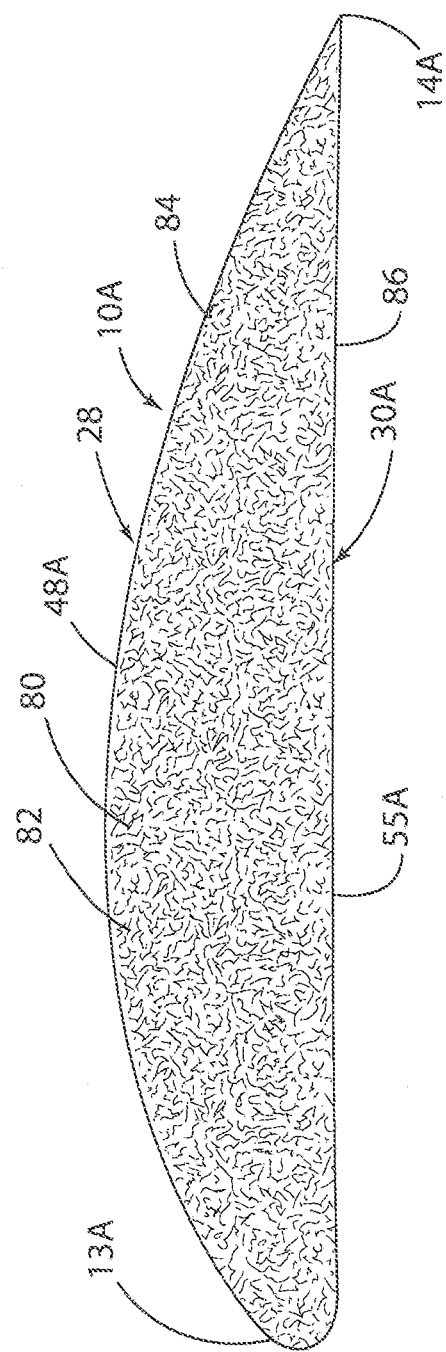
FIG. 5 is a cross-sectional view of a wing flap according to another aspect of the present invention.

With further reference to FIG. 5, a flap 10A according to another aspect of the present invention may include upper and lower surfaces 48A and 55A that are porous or have porous portions. Internal space 80 of flap 10A is partially or completely filled with filler material such as foam 82. Foam 82 may comprise metallic foam or other suitable material. The upper and lower surfaces 48A and 55A, respectively may comprise thin upper and lower sheets of material 84 and 86 having a plurality of perforations therethrough. Sheets of material 84 and 86 may be aluminum, fiber composites, or other suitable material.

The acoustic liners may also comprise extended-reaction liners. For example, the internal volume of the flap side edge 21 (or 23) may be filled with a bulk material such as foam, and allowing communication between the interior and exterior of the flap side edge via a porous surface such as a perforated face sheet, wire mesh, or the like.

Because of the porous nature of one or more segments of the flap surface near the side edge 21 (or 22), the aeroacoustic environment outside the flap 10 can communicate with the chamber or chambers 60 within the flap 10. As discussed above, the interior volume of the flap 10 contains one or more chambers 60, which may or may not be filled with sound-absorbent acoustic material such as a porous bulk material such as, but not limited to, foam or the like. The acoustic treatment imbedded within the volume of the flap 10 changes the boundary condition at the surface of the flap 10, such that the strength of the local hydrodynamic fluctuations associated with the scrubbing of the unsteady flow over the side edge surface is reduced. Furthermore, the change in the boundary condition also inhibits the conversion of hydrodynamic fluctuations into noise, and also inhibits near field propagation of this noise. The boundary condition presented at the porous surface is such that it inhibits sound from being generated by the flow interaction with this surface.

Software design tools are available to assist in the design of the interior chambers 60 of the flap 10. Known software previously utilized for design of acoustic liners in engine nacelles may be utilized to assist in the design of chambers 60. Such software may also be modified somewhat to thereby adapt it for use in designing chambers 60 in flap 10. The use of these design tools allows the efficient design of acoustic liners with multiple chambers, each of which can be designed with unique geometries. This design tool also allows a convenient evaluation of configurations designed to fit within a small volume, while exploring combinations of chambers that result in broadband noise reduction.

Figure 6:
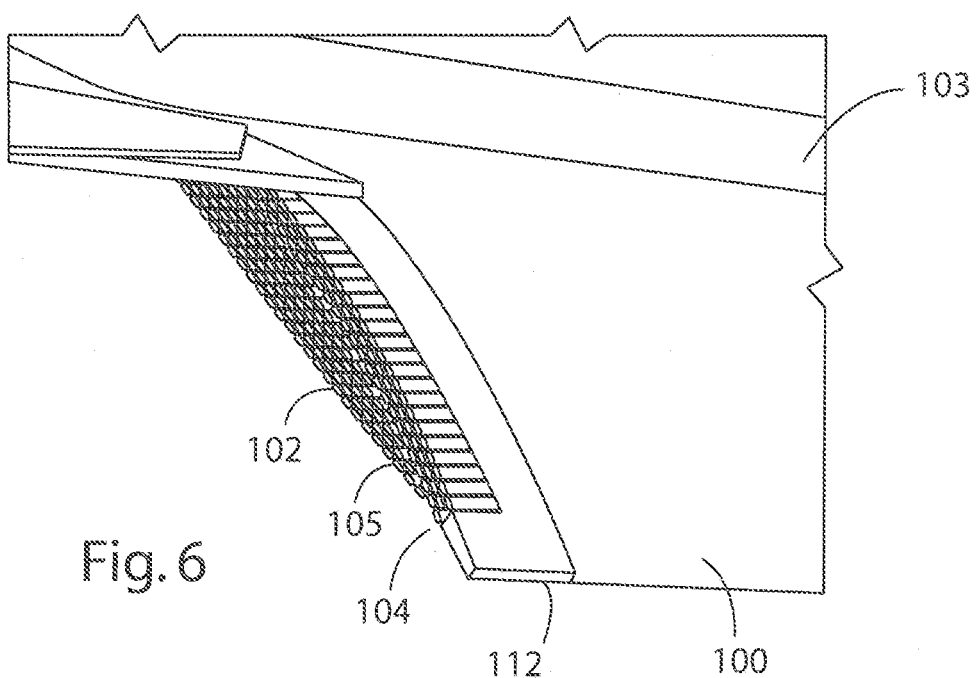
FIG. 6 is a partially fragmentary isometric view of an end of a flap including a plurality of protrusions or fins to reduce the amount of noise radiated from the aircraft.
Figure 7:
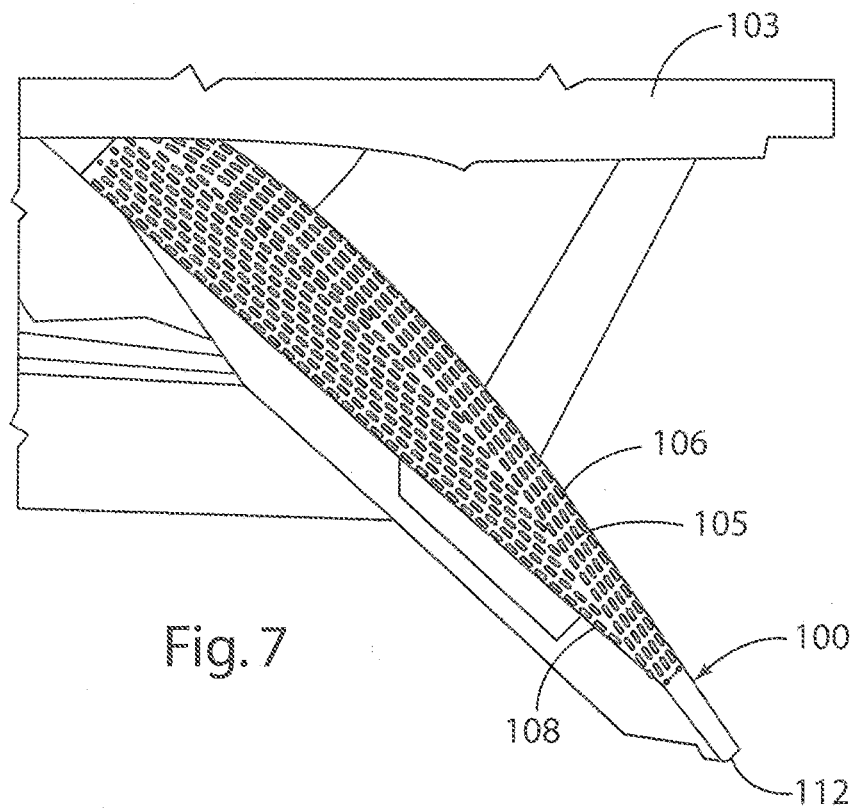
FIG. 7 is a partially fragmentary view of the flap of FIG. 6.
Figure 8:
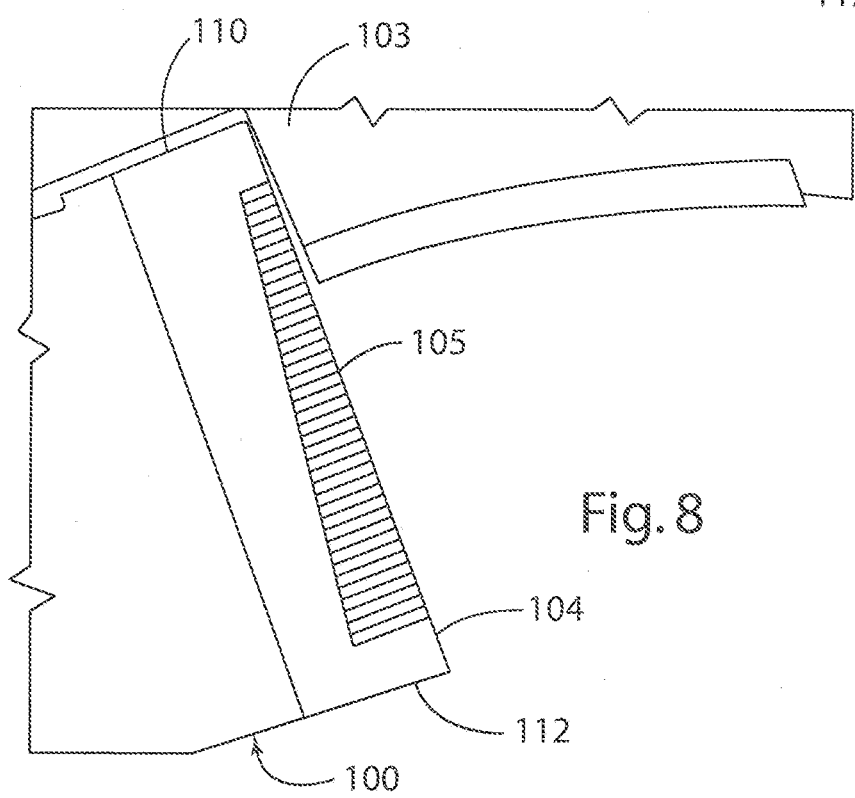
FIG. 8 is a partially fragmentary top plan view of the flap of FIG. 6.

With further reference to FIGS. 6-8, a wing flap 100 according to another aspect of the present invention includes a first end portion or region 102 including a plurality of protrusions 105 that reduce noise production at edge 104 of flap 100. As discussed in more detail below, the protrusions 105 form a plurality of intricate, interconnected passages such that high pressured fluid entering the space between protrusions 105 flows toward one or more regions of lower pressure on other parts of the flap end portion 102. The high losses/damping induced by the intricate internal structure provides a strong mechanism for equalizing the steady pressure field on the surfaces adjacent to the edge 104 of flap 100, and also reduces the amplitude of fluctuations in the flow near the flap edge 104.

Wing flap 100 may have an overall construction that is substantially similar to the flap 10 described in more detail above in connection with FIG. 1. Wing flap 100 may be operably connected to an aircraft wing structure 103 utilizing known mechanisms (not shown) that provide for deployment of wing flap 100, for example, during takeoff and landing. It will be understood that wing flap 100 may include an opposite end portion (not shown) that may also include a plurality of protrusions 105. Flap 100 may include an upper surface 106, a lower surface 108, a leading edge 110, and a trailing edge 112.

With further reference to FIG. 9A, wing flap 100 defines a chord length "C" between the leading edge 110 and trailing edge 112. In one embodiment, the protrusions 105 are positioned in a region 102 between first line 114 and second line 116. The first line 114 may comprise a 90% chord line, and line 116 may comprise a 10% chord line. That is the line 114 may be spaced a distance equal to 10% of the chord C from leading edge 110, and line 116 may be spaced a distance equal to 90% of the chord from leading edge 110. In this example, the region 102 that includes protrusions 105 extends a length that is equal to 80% of the chord C. Depending on the specifics of the design and application of the wing flap 100, and the high lift wing configuration of a given application, the protrusions 105 may extend closer to leading edge 110 and/or closer to trailing edge 112, or the protrusions 105 may be spaced further from leading edge 110 and/or trailing edge 112. For example, line 114 may comprise a 95% chord line, and line 116 may comprise a 5% chord line. Alternatively, line 114 may comprise an 80% chord line, and line 116 may comprise a 20% chord line. It will be understood that the lines 114 and 116 could also have unequal spacing with respect to the leading and trailing edges 110 and 112, respectively. The lines 114 and 116 are spaced from the leading and trailing edges 110 and 112, respectively, to reduce/minimize aerodynamic degradation of the airflow adjacent to the front portion 118 and rear portion 120 of end 122 of wing flap 100. The protrusions 105 are preferably rigid, and may be made from light-weight, high strength materials (e.g. aluminum alloys or composite materials) utilized to construct other portions of wing flap 100.

Protrusions 105 include ends 123 that may be substantially planar to define a flap end plane 125. Wing flap 100 includes an angled, generally planar outwardly facing surface 124 (see also FIGS. 10 and 11). Protrusions 105 extend outwardly from surface 124 to define a length. The surface 124, plane 123, and spaces between protrusions 105 define a volume 154. The protrusions 105 are preferably shorter near the leading edge 110 and longer near the trailing edge 112. The lengths of the protrusions 105 may be scaled relative to a maximum flap thickness t (FIG. 10). Near the leading edge 110, the protrusions 105 have a length that is about 30% to about 40% of the maximum thickness t. Near the trailing edge 112, the protrusions 105 have a length "L2" that is equal to about 100% to about 130% of the maximum thickness t. As discussed in more detail below in connection with FIGS. 10 and 11, wing flap 100 of FIG. 9A includes a plurality of oblong protrusions or fins 105. With further reference to FIG. 9B, a wing flap 100A according to another aspect of the present invention includes a plurality of protrusions 105A having a substantially circular cross-sectional shape. The configuration of protrusions 105A is described in more detail below in connection with FIGS. 12 and 13. The lengths and the positions of the protrusions 105A (FIG. 9B) may be substantially the same as the position, length, and spacing of protrusions 105 as discussed above in connection with FIG. 9A. Thus, lines 114A and 116A may be spaced from leading edge 110A in substantially the same manner as lines 114 and 116 are spaced relative to leading edge 110.

Figure 11:
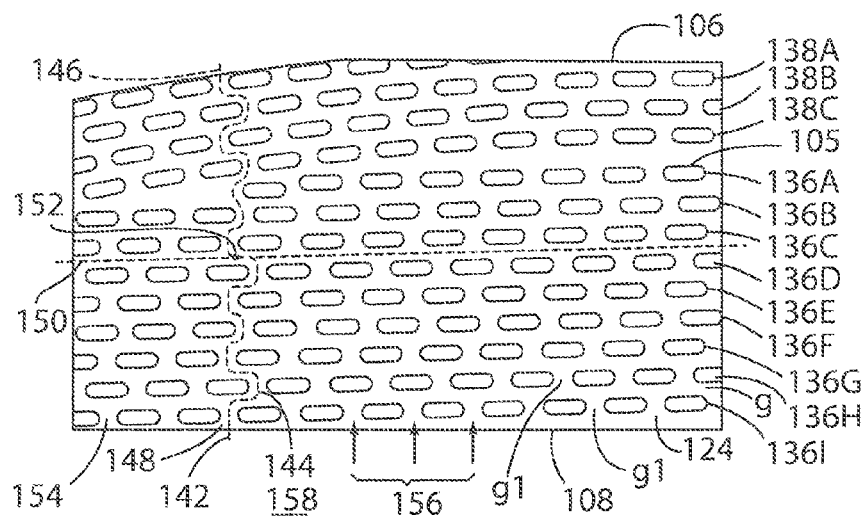
FIG. 11 is a partially fragmentary enlarged view of a portion of the flap of FIG. 10.
Figure 11A:
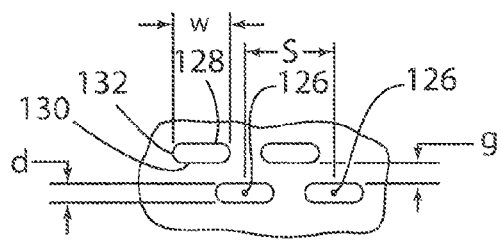
FIG. 11A is an enlarged view of a portion of the flap of FIG. 11.

With further reference to FIGS. 10, 11, and 11A protrusions 105 may have an oblong cross-sectional shape to thereby define fins having a width "w," and a height or thickness "d." The protrusions or fins 105 further define centers 126, upper and lower surfaces 130, and forward and rear surfaces 132 and 134. The protrusions 105 may be arranged in a plurality of generally horizontal rows 138A-138C and 136A-136I. In the illustrated example, the rows 138A-138C are curved somewhat, and generally follow the contour of upper surface 106. The rows 136A-136I are approximately linear, and generally follow the contour of lower surface 108. Protrusions 105 of vertically adjacent rows are spaced apart a vertical distance or gap "g." The protrusions 105 of each row are also spaced apart a distance "s" to form horizontal gaps "g1 ." The protrusions 105 of vertically adjacent rows of protrusions 105 are staggered. Thus, the gap "g1" of a given row is vertically aligned with protrusions 105 of the vertically adjacent rows. The staggered spacing of protrusions 105 forms a plurality of vertical passageways 142 having a plurality of vertically juxtaposed S-shaped bends 144. Vertical passageways 142 extend between and fluidly interconnect openings 146 adjacent to upper surface 106, and lower openings 148 adjacent to lower surface 108 of flap 100. The vertical spacing g between adjacent rows of protrusions 105 also forms a plurality of generally horizontal passageways 150 that intersect the vertical passageways 142 at a plurality of intersections or junctions 152. The passageways 142 and 150 are generally U-shaped in a cross-section, with approximately parallel sides defined by the outer surfaces of protrusions 105 and a base surface defined by surface 124. It will be understood that protrusions 105 could have a substantially uniform cross-sectional shape, or the protrusions 105 may be tapered (e.g. cone-shaped, etc.) such that the sides of the "U-shape" of the passageways or channels are not linear in cross cross-section.

The numerous bends 144 in passageways 142 resulting from the staggered position of protrusions 105 prevents the creation of direct passageways between the upper and lower surfaces 106 and 108 of wing flap 100. Also, because the vertical passageways 142 are fluidly connected to the horizontal passageways 150 at junctions 152, every region within the internal flow passages 142 and 150 is in fluid communication with all other regions in volume 154 surrounding protrusions 105. As high pressure airflow 156 seeps into openings 148 from a region 158 below the flap, highly interactive and non-linear flow is established within the space 154 formed by passageways 142 and 150. Due to significant interactions between the wakes produced by each protrusion 105, viscous losses within the volume 154 are significant, thus substantially affecting the steady component of the airflow around or at edge 104 of wing flap 100. Because the protrusions 105 are relatively stiff/firm structurally, the loss in flap lift is typically much less than the loss in flap lift experienced with conventional known softer brushes. The global communication that exists among the flow passages 142 and 150 provides a mechanism to lessen the pressure gradients in the vicinity of the flap edge 104. This creates a desired alteration to both the steady and unsteady (fluctuating) components of the flow field at flap side edge 104. In addition to the flow losses, the interconnection of the internal passages 142 and 150 also presents a reactive correction to the impendence of the tip surface.

The overall characteristics of the protrusions 105 and their effectiveness in positively altering the edge flow field depend on several parameters. With reference to FIG. 11A, the fin width "w," spacing "s," thickness "d," gap "g," the length of the individual protrusions 105, and the extent of the edge surface area 102 where the protrusions 105 are applied (i.e. the distance between lines 114 and 116 of FIG. 9A) are significant parameters. In general, the ratio of protrusion spacing "s" to protrusion width "w" preferably falls within the range of $1.2 \le s/w \le 1.6$. The ratio of protrusion width "w" to the protrusion thickness "d" preferably falls within the range of $1.0 \le w/d \le 5.0$.

Figure 12:
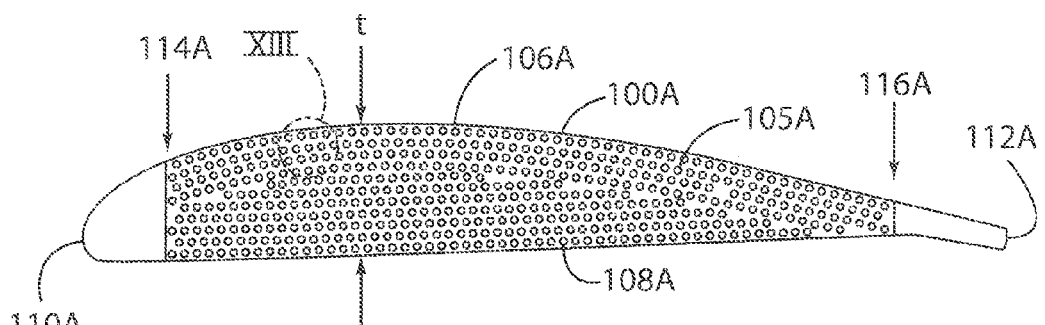
FIG. 12 is an end view of the flap of FIG. 9B.
Figure 13:
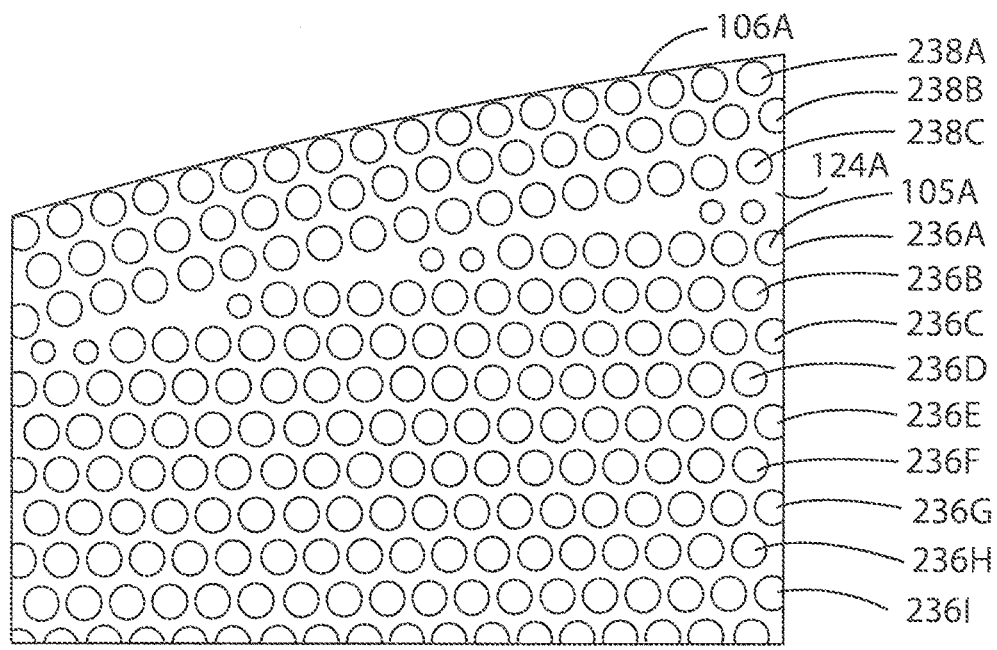
FIG. 13 is a partially fragmentary enlarged view of a portion of the flap of FIG. 9B.
Figure 13A:
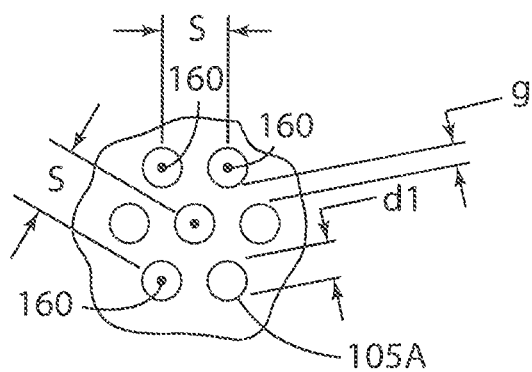
FIG. 13A is an enlarged view of a portion of the flap of FIG. 13.

With further reference to FIGS. 12, 13, and 13A the limit of w/d approaching 1.0 corresponds to protrusions having a circular cross-section. Circular protrusions 105A have a diameter d1, and define at centers 160. The protrusions 105A may be spaced apart by distances "s" such that each circular protrusion 105 is equally spaced from adjacent protrusions 105A. Referring again to FIG. 11, the ratio of the gap "g" to the protrusion thickness "d" is preferably within a range of about $0.5 \le g/d \le 1.2$. Protrusions 105A may form generally linear rows 236A-236I, and curved rows 238A-238C. Protrusions 105A form a plurality of interconnected passageways in substantially the same manner as protrusions 105. In addition to the oblong and circular cross-sectional configurations described above, it will be understood that the protrusions may have other cross-sectional shapes (e.g. triangular, square, diamond, etc.). Furthermore, a given flap edge 104 may include protrusions having different shapes and/or different sizes in different regions.

The edge treatment described above in connection with FIGS. 6-13A reduces the amount of airframe noise radiated to a community adjacent to an airport or other such facility. Unlike known soft brushes, the protrusions/edge treatment of the present invention specifically addresses the process of noise generation. This is a result of the interaction of unsteady flow with the flap side edge 104. This edge treatment also simultaneously minimizes the aerodynamic penalties/losses. By limiting the control action to the steady and fluctuating fields within a very small region near the edge 104, the gross aerodynamic characteristics of the flap 100 are left unaltered and there is little, if any, aerodynamic penalty. Because of the gaps between the protrusions 105 and/or 105A protruding from one or more segments of the flap tip surface 124, the aeroacoustic environment outside the flap 100 can communicate with the complex and elaborate passages 142 and 150 associated with the protrusions 105 and/or 105A embedded within the solid structure. The intricate passages 142 and 150 alter the effective boundary condition at the end edge 104 of the flap 100, significantly reducing the steady pressure differential experience by the edge 104. As a result, the vortex formation process at the edge 104 is either delayed or substantially weakened in such a way that the strength of the local hydrodynamic fluctuations associated with the scrubbing of the unsteady flow over the side edge surface 104 is diminished. Furthermore, the change in boundary condition is also believed to inhibit the conversion of hydrodynamic fluctuations to noise and the far-field propagation of this noise.

While preferred embodiments of the present invention are shown and described, it is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A flap of the type that is movably connected to an aircraft wing to provide control of an aircraft in flight, the flap comprising:
an elongated flap structure defining first and second opposite ends and leading and trailing edges extending lengthwise between the opposite ends, the elongated flap structure defining upper and lower side surfaces extending lengthwise between opposite ends and fore-aft between the leading and trailing edges, and wherein, in use, air flow adjacent to the opposite ends forms high pressure and lower pressure regions;
wherein at least a portion of the first opposite end includes a plurality of substantially rigid, laterally extending protrusions that are contained within the volume of the flap structure and are spaced apart to form a plurality of fluidly interconnected passageways between the protrusions, the passageways having openings adjacent to the upper and lower side surfaces of the elongated flap structure, wherein the protrusions maintain the profile of the flap and wherein the protrusion distribution is not segmented by significant voids in the fore-aft direction between the leading and trailing edges; and further wherein the passageways include a plurality of bends whereby, in use, high pressure fluid enters the openings at a high pressure region and flows through the passageways to a low pressure region to thereby provide a boundary condition that inhibits noise resulting from airflow around the first opposite end of the elongated flap structure.

2. The flap of claim 1, wherein:
the protrusions form a plurality of continuous and generally horizontal rows.

3. The flap of claim 2, wherein:
at least some of the horizontal rows are substantially linear.

4. The flap of claim 2, wherein:
the protrusions of each row are horizontally spaced apart to form horizontal gaps having a horizontal gap dimension thereof, and wherein protrusions of vertically adjacent rows are generally aligned vertically with the horizontal gaps such that the passageways comprise a plurality of vertically juxtaposed S-shaped bends.

5. The flap of claim 4, wherein:
the one end defines a base surface extending transversely between the upper and lower side surfaces, and wherein the protrusions extend from the base surface to define lengths, and wherein at least some of the protrusions are adjacent to the leading and trailing edges, and wherein the lengths of the protrusions adjacent to the leading edge are significantly less than the lengths of the protrusions adjacent to the trailing edge.

6. The flap of claim 5, wherein:
the upper and lower sides of the elongated flap structure define a maximum thickness therebetween, and wherein the protrusions adjacent to the leading edge have a length that is in a range of about 30% to about 40% of the maximum thickness, and the protrusions adjacent to the trailing edge have a length that is in a range of about 100% to about 130% of the maximum thickness.

7. The flap of claim 6, wherein:
the protrusions define generally planar end surfaces, and wherein the end surfaces are substantially coplanar.

8. The flap of claim 6, wherein:
each protrusion defines a distance from the leading edge;
the base surface is generally planar such that the lengths of the protrusions increase linearly as a function of the distances of the protrusions from the leading edge.

9. The flap of claim 4, wherein:
the protrusions include forwardly and rearwardly facing surfaces that define a width therebetween, the protrusions further including upwardly and downwardly facing surfaces defining a thickness therebetween, and wherein a ratio of the width to the thickness of the protrusions is in a range of about 1.0 to about 5.0.

10. The flap of claim 9, wherein:
a ratio of the horizontal gap dimension to the thickness is in a range of about 0.5 to about 1.2.

11. The flap of claim 9, wherein:
the protrusions define centers, and the centers of adjacent pairs of protrusions in each row define a spacing dimension therebetween, and wherein a ratio of the spacing dimension to the width of at least one of the protrusions of each adjacent pair of protrusions falls in a range of about 1.2 to about 1.6.

12. The flap of claim 11, wherein:
the protrusions of each row have substantially identical cross sectional shapes and sizes.

13. The flap of claim 12, wherein:
the protrusions in each row are equally spaced apart from adjacent protrusions in each row.

14. A flap of the type that is movably connected to an aircraft wing to provide control of an aircraft in flight, the flap comprising:
an elongated flap structure defining first and second opposite ends and leading and trailing edges extending lengthwise between the opposite ends, the elongated flap structure defining upper and lower side surfaces extending lengthwise between opposite ends and fore-aft between the leading and trailing edges, and wherein, in use, air flow adjacent to the opposite ends forms high pressure and lower pressure regions;

wherein at least a portion of the first opposite end includes a plurality of substantially rigid, laterally extending protrusions that are contained within the volume of the flap structure and are spaced apart to form a plurality of fluidly interconnected passageways between the protrusions, the passageways having openings adjacent to the upper and lower side surfaces of the elongated flap structure, wherein the protrusions maintain the profile of the flap and wherein the protrusion distribution is not segmented by significant voids in the fore-aft direction between the leading and trailing edges; and further wherein the passageways include a plurality of bends whereby, in use, high pressure fluid enters the openings at a high pressure region and flows through the passageways to a low pressure region to thereby provide a boundary condition that inhibits noise resulting from airflow around the first opposite end of the elongated flap structure;

wherein the protrusions form a plurality of continuous and generally horizontal rows;

wherein the protrusions of each row are horizontally spaced apart to form horizontal gaps, and wherein protrusions of vertically adjacent rows are generally aligned vertically with the horizontal gaps such that the passageways comprise a plurality of vertically juxtaposed S-shaped bends;

wherein the one end defines a base surface extending transversely between the upper and lower side surfaces, and wherein the protrusions extend from the base surface to define lengths, and wherein at least some of the protrusions are adjacent to the leading and trailing edges, and wherein the lengths of the protrusions adjacent to the leading edge are significantly less than the lengths of the protrusions adjacent to the trailing edge;

wherein the upper and lower sides of the elongated flap structure define a maximum thickness therebetween, and wherein the protrusions adjacent to the leading edge have a length that is in the range of about 30% to 40% of the maximum thickness, and the protrusions adjacent to the trailing edge have a length that is in a range of about 100% to about 130% of the maximum thickness;

wherein each protrusion defines a distance from the leading edge; the base surface is generally planar such that the lengths of the protrusions increase linearly as a function of the distance of the protrusions from the leading edge; and wherein:

the elongated flap structure defines a chord length at the first opposite end;

the elongated flap structure defines a smoothly curved concave outer surface extending along the leading edge such that the elongated flap structure is generally U-shaped in cross section adjacent to the leading edge, and wherein the upper and lower sides converge at the trailing edge such that the elongated flap structure is generally V-shaped in cross section adjacent to the trailing edge, and wherein the first opposite end of the elongated flap structure includes a generally planar forward surface portion that is generally orthogonal to the concave outer surface and intersects the concave outer surface to define a curved perimeter portion, the planar forward surface portion defining a generally vertical rear edge, the elongated flap further including a generally planar rearwardly facing vertical surface that intersects the planar forward surface portion along the vertical rear edge, and wherein the generally planar rearwardly facing vertical surface is spaced apart from the leading edge at a distance that is equal to approximately 10% of the chord length;

the first opposite end of the elongated flap structure further including a generally planar rearward surface portion that is coplanar with the generally planar forward surface portion and with the generally planar end surfaces of the protrusions, the elongated flap structure further including a generally planar forwardly facing vertical surface that intersects the generally planar rearward surface portion such that the rearward surface portion defines a perimeter that is approximately triangular, and wherein the generally planar forwardly facing vertical surface is spaced apart from the trailing edge a distance that is equal to approximately 10% of the chord length.

15. A flap of the type that is movably connected to an aircraft wing to provide control of the aircraft in flight, the flap comprising:

a flap structure having leading and trailing edges and defining a chord extending between the leading and trailing edges in a fore-aft direction, the flap structure having upper and lower surfaces extending between the leading and trailing edges, the flap structure further defining first and second opposite ends;

wherein at least the first end includes end portions forming a plurality of passageways contained within the volume of the flap structure and extending vertically between the upper and lower surfaces, and a plurality of passageways extending fore-aft, and wherein the vertically extending passageways and the fore-aft passageways intersect and fluidly interconnect with each other at a plurality of horizontally and vertically spaced apart locations such that, in use, air flows from the vertically extending passageways into the fore-aft passageways, and wherein at least some of the vertical passageways and the fore-aft passageways are generally U-shaped in cross section and open outwardly away from the first end of the flap structure such that air can flow transversely out of the passageways.

16. The flap of claim 15, wherein:

the end portions comprise a plurality of spaced apart rigid protrusions.

17. The flap of claim 16, wherein:

the protrusions are disposed in rows, wherein the protrusions of adjacent rows are staggered such that the passageways form a plurality of vertically juxtaposed S-shaped bends.

18. A method of reducing noise radiated from a side edge of a partial-span wing flap during aircraft approach and landing, the method comprising:

providing a plurality of rigid protrusions on the side portion of the wing flap;

utilizing the protrusions to reduce a steady pressure differential experienced by the side edge in use;

utilizing the protrusions to reduce the strength of local hydrodynamic fluctuations associated with scrubbing of unsteady flow over the side edge.

19. The method of claim 18, wherein:

the protrusions form a plurality of interconnected non-linear passageways; and including:

forming regions of high air pressure on the side edge and regions having lower air pressure on the side edge;

causing at least some of the air to flow through the passageways from the high pressure regions to the lower pressure regions.

20. The method of claim 19, including:

positioning at least some of the protrusions in generally parallel rows.

* * * * *